United States Patent
Omoto

(10) Patent No.: US 8,608,387 B2
(45) Date of Patent: Dec. 17, 2013

(54) ROLLER BEARING AND MAIN SHAFT SUPPORT STRUCTURE OF WIND-POWER GENERATOR

(75) Inventor: Tatsuya Omoto, Suzuka (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 13/544,205

(22) Filed: Jul. 9, 2012

(65) Prior Publication Data

US 2012/0282100 A1 Nov. 8, 2012

Related U.S. Application Data

(63) Continuation of application No. 12/086,501, filed as application No. PCT/JP2006/321698 on Oct. 31, 2006, now Pat. No. 8,308,372.

(30) Foreign Application Priority Data

Dec. 16, 2005 (JP) .................................. 2005-363661
Dec. 16, 2005 (JP) .................................. 2005-363662
Mar. 28, 2006 (JP) .................................. 2006-087829

(51) Int. Cl.
*F16C 33/51* (2006.01)

(52) U.S. Cl.
USPC .......................................... 384/573; 384/578

(58) Field of Classification Search
USPC .................. 384/523, 530, 548, 573, 577, 578
See application file for complete search history.

(56) References Cited

FOREIGN PATENT DOCUMENTS

| | | |
|---|---|---|
| CH | 355 659 | 7/1961 |
| DE | 18 55 943 | 8/1962 |
| DE | 31 15 780 | 11/1982 |
| DE | 84 20 133 | 10/1984 |
| DE | 42 20 585 | 1/1994 |
| EP | 1 408 248 A2 | 4/2004 |
| GB | 936 379 | 9/1963 |
| JP | 54-015145 | 1/1979 |
| JP | 57-096815 | 6/1985 |
| JP | 2-146314 | 6/1990 |
| JP | 6-58334 | 3/1994 |
| JP | 2002-195270 | 7/2002 |
| JP | 2002-339979 | 11/2002 |
| JP | 2003-194068 | 7/2003 |
| JP | 2004-132473 | 4/2004 |
| JP | 2004-144283 | 5/2004 |
| JP | 2005-054984 | 3/2005 |
| JP | 2005-147331 | 6/2005 |
| JP | 2005-214424 | 8/2005 |
| JP | 2005-308135 | 11/2005 |
| JP | 2007-162912 | 6/2007 |
| JP | 2007-247687 | 9/2007 |
| JP | 2007-255627 | 10/2007 |

*Primary Examiner* — William C Joyce
(74) *Attorney, Agent, or Firm* — Clark & Brody

(57) ABSTRACT

A tapered roller bearing comprises an outer ring (32), an inner ring (33), a plurality of tapered rollers (34) arranged between the outer ring (32) and the inner ring (33), and a plurality of retainer segments (11a) having pockets for holding the tapered rollers (34) and arranged so as to be continuously lined with each other in a circumferential direction between the outer ring (32) and the inner ring (33). Here, the tapered roller (34) is arranged between two adjacent retainer segments (11b) and (11c) except for between the first retainer segment (11a) and the last retainer segment lined continuously with each other in the circumferential direction.

7 Claims, 7 Drawing Sheets

PRIOR ART

US 8,608,387 B2

ROLLER BEARING AND MAIN SHAFT SUPPORT STRUCTURE OF WIND-POWER GENERATOR

This application is a continuation of U.S. Ser. No. 12/086,501 filed on Jun. 13, 2008, which is a national phase of PCT/JP2006/321698 filed on Oct. 31, 2006, which is published as WO2007/058402 on Jun. 21, 2007.

TECHNICAL FIELD

The present invention relates to a roller bearing, a main shaft support structure of a wind-power generator, an intermediate element, and a retainer segment.

BACKGROUND ART

A roller bearing comprises an outer ring, an inner ring, a plurality of rollers arranged between the outer ring and the inner ring, and a retainer for holding the plurality of rollers in general. The retainer for holding the rollers includes various kinds such as a resin retainer, a pressed retainer, a ground retainer, and a welded retainer depending on its material and manufacturing method, and those are used based on purposes and characteristics. In addition, the retainer is an integrated type, that is, it comprises one annular part in general.

Since a roller bearing that supports a main shaft of a wind-power generator on which a blade for receiving wind is mounted needs to receive a high load, the roller bearing itself is large in size. Thus, since each member constituting the roller bearing such as a roller and a retainer is also large in size, it is difficult to produce and assemble such member. In this case, when each member can be split, it can be easily produced and assembled.

Here, a split type retainer that is split along a split line extending in an axial direction in a roller bearing is disclosed in European Patent Publication No. 1408248A2. FIG. 14 is a perspective view showing a retainer segment of the split type retainer disclosed in the European Patent Publication No. 1408248A2. Referring to FIG. 14, a retainer segment 101a has a plurality of pillar parts 103a, 103b, 103c, 103d and 103e extending in an axial direction so as to form a plurality of pockets 104 for holding rollers, and connection parts 102a and 102b extending in a circumferential direction so as to connect the plurality of pillar parts 103a to 103e.

FIG. 15 is a sectional view showing a part of a roller bearing containing the retainer segment 101a shown in FIG. 14. The constitution of a roller bearing 111 containing the retainer segment 101a will be described with reference to FIGS. 14 and 15. The roller bearing 111 has an outer ring 112, an inner ring 113, a plurality of rollers 114, and the plurality of retainer segments 101a, 101b and 101c holding the plurality of rollers 114. The plurality of rollers 114 are held by the plurality of retainer segments 101a and the like in the vicinity of a PCD (Pitch Circle Diameter) 105 in which the roller movement is most stable. The retainer segment 101a for retaining the plurality of rollers 114 is arranged such that the pillar parts 103a and 103e provided at outermost positions in the circumferential direction abut on the circumferentially adjacent retainer segments 101b and 101c having the same configuration. The plurality of retainer segments 101a, 101b and 101c are continuously lined with each other and incorporated in the roller bearing 111, whereby one annular retainer is formed in the roller bearing 111.

The above one annular retainer is formed by lining the plurality of retainer segments continuously with each other in the circumferential direction. When the plurality of retainer segments is continuously lined with each other in the circumferential direction to form the one annular retainer, a circumferential gap is needed because of the thermal expansion and the like.

Here, when this circumferential gap is too large, the retainer segment moves largely in the circumferential direction and the adjacent retainer segments collide with each other, which could cause noise and the retainer segment to be damaged. Meanwhile, as the retainer segment thermally expands according to the temperature rise, when the circumferential gap is narrow, there is no gap between the adjacent retainer segments because of the thermal expansion, causing the adjacent retainer segments to press strongly each other to reach a deadlock. The circumferential stress due to the thermal expansion causes the friction and abrasion of the retainer segment, which also causes the retainer segment to be damaged.

Here, according to the European Patent Publication No. 1408248A2, when the retainer segments abut on to be continuously lined with each other in the circumferential direction, the circumferential gap dimension can be appropriate by setting the last gap dimension between the first retainer segment and the last retainer segment to not less than 0.15% but less than 1% of the circumference of a circle passing through the center of the retainer segment.

However, since each retainer segment is manufactured separately, each retainer segment has a dimensional deviation in the circumferential direction. When the retainer segments having such dimensional deviation are arranged so as to be continuously lined with each other in the circumferential direction, the dimensional deviation are accumulated. Thus, each retainer segment has to be manufactured with high accuracy to keep the circumferential gap dimension within the above predetermined range, which causes the productivity of the retainer segment to deteriorate and accordingly causes the productivity of the roller bearing to deteriorate.

In addition, according to the European Patent Publication No. 1408248A2, the two adjacent retainer segments are continuously lined such that the pillar parts provided at outermost positions in the circumferential direction abut on each other. Thus, the two pillar parts are in series with each other between the two adjacent retainer segments. In this case, since the circumferential space in which the retainer segment is arranged is limited, it is necessary to reduce the number of rollers in the roller bearing accordingly. Therefore, the roller bearing cannot contain many rollers and cannot receive a high load.

DISCLOSURE OF THE INVENTION

It is an object of the present invention to provide a roller bearing capable of receiving a high load.

It is another object of the present invention to provide a roller bearing having high productivity.

It is still another object of the present invention to provide a retainer segment capable of holding a roller arranged between the adjacent retainer segments stably.

It is still another object of the present invention to provide a main shaft support structure of a wind-power generator having high productivity.

It is still another object of the present invention to provide a main shaft support structure of a wind-power generator having high productivity and capable of receiving a high load.

It is still another object of the present invention to provide an intermediate element arranged stably.

A roller bearing according to the present invention comprises an outer ring, an inner ring, a plurality of rollers arranged between the outer ring and the inner ring, and a plurality of retainer segments having pockets for holding the rollers and arranged so as to be continuously lined with each other in a circumferential direction between the outer ring and the inner ring. Here, the roller is arranged between the two adjacent retainer segments except for between the first retainer segment and the last retainer segment continuously lined with each other in the circumferential direction.

According to this constitution, the number of the rollers contained in the roller bearing can be increased and a load can be received by the roller arranged between the two retainer segments as well as the roller held by the retainer segment. Thus, the roller bearing can receive a high load. Here, the term "except for between the first retainer segment and the last retainer segment" does not mean that the roller is not arranged between them but means that the roller may be arranged or may not be arranged between them.

The retainer segment is a body having at least one pocket and provided by splitting one annular retainer along a split line extending in an axial direction. In addition, the first retainer segment means the retainer segment arranged first when the retainer segments are continuously lined with each other in the circumferential direction, and the last retainer segment means the retainer segment arranged last when the adjacent retainer segments abut on each other and lined continuously in the circumferential direction.

When the retainer segments are continuously lined with each other in the circumferential direction and form the one annular retainer, a gap within a certain range is needed in view of the thermal expansion of each retainer segment. Here, for example, an intermediate element for adjusting the circumferential gap dimension may be arranged between the first retainer segment and the last retainer segment, or the intermediate element and the roller for adjusting the gap dimension may be arranged therebetween.

Preferably, the retainer segment comprises a pair of projections positioned at axial both ends and projecting in the circumferential direction. Thus, the axial movement of the roller arranged between the adjacent retainer segments can be restricted by the pair of projections. Therefore, the roller provided between the adjacent retainer segments can be stably arranged by the pair of projections.

More preferably, a pocket for holding the roller is formed between the two adjacent retainer segments. According to this constitution, the roller provided between the adjacent retainer segments can be appropriately held by the pocket. In this case, since the pairs of projections of the adjacent retainer segments abut on each other, the circumferential load is applied to the pairs of projections. Therefore, since the circumferential load is not applied to the pillar part forming the pocket, the pillar part can be prevented from being deformed and damaged. In addition, the roller held in the pocket can be prevented from being locked.

Still preferably, a guide face for guiding the retainer segment is provided on the outer side of the retainer segment in the circumferential direction. According to this constitution, the roller retained between the two adjacent retainer segments can guide the adjacent retainer segments. Therefore, the radial positions of the adjacent retainer segments can be stabilized.

Still preferably, the roller is a tapered roller. The roller bearing used in the main shaft of the wind-power generator needs to receive a thrust load, a moment load and a radial load. Here, when the roller is the tapered roller, it can receive the thrust load, moment load and radial load.

According to another aspect of the present invention, a retainer segment has a pocket for holding a roller and is arranged to be continuously lined with each other in a circumferential direction between an outer ring and an inner ring contained in a roller bearing. Here, the retainer segment comprises a pair of projections positioned at axial both ends and projecting in the circumferential direction.

Since the pair of projections of the above retainer segment projects in the circumferential direction, the axial movement of the roller arranged between the adjacent retainer segments can be restricted. Therefore, the roller arranged between the adjacent retainer segments can be stably arranged.

According to still another aspect of the present invention, a main shaft support structure of a wind-power generator comprises a blade for receiving wind power, a main shaft having one end fixed to the blade and rotating with the blade, and a roller bearing incorporated in a fixing member and supporting the main shaft rotatably. The roller bearing comprises an outer ring, an inner ring, a plurality of rollers arranged between the outer ring and the inner ring, and a plurality of retainer segments having pockets for holding the rollers and arranged so as to be continuously lined with each other in a circumferential direction between the outer ring and the inner ring. The roller is arranged between the two adjacent retainer segments except for between the first retainer segment and the last retainer segment lined continuously with each other in the circumferential direction.

Since the main shaft support structure of the wind-power generator having the above constitution comprises the roller bearing containing the retainer segments provided by splitting one annular retainer, its productivity is high. In addition, since it contains the roller bearing having the roller between the adjacent retainer segments, it can receive a higher load.

In addition, a roller bearing according to the present invention comprises an outer ring, an inner ring, a plurality of rollers arranged between the outer ring and the inner ring, a plurality of retainer segments having pockets for holding the rollers and arranged so as to be continuously lined with each other in a circumferential direction between the outer ring and the inner ring, and an intermediate element arranged between the first retainer segment and the last retainer segment lined continuously with each other in the circumferential direction.

According to this constitution, the intermediate element can be arranged in the gap between the first retainer segment and the last retainer segment. Thus, the gap dimension between the first retainer segment and the last retainer segment can be within the set range regardless of the dimensional deviation of the retainer segments in the circumferential direction. Thus, it is not necessary to produce each retainer segment with high accuracy, so that the productivity of the retainer segment can be improved. In addition, accordingly, the productivity of the roller bearing can be improved. In this case, the roller and the intermediate element may be arranged therebetween.

Here, the retainer segment has at least one pocket for housing the roller and it is different from the intermediate element that has no pocket for housing the roller.

Preferably, the retainer segment comprises a pair of projections positioned at axial both ends and projecting in the circumferential direction, and the intermediate element abuts on circumferential end faces of the pair of projections provided in the first retainer segment and circumferential end faces of the pair of projections provided in the last retainer segment. According to this constitution, the circumferential load from the intermediate element can be received by the pair of projections. Thus, the circumferential load is not applied from the intermediate element to the pillar part forming the pocket contained in the retainer segment. Therefore, the pillar part can be prevented from being deformed and damaged and the roller held in the pocket can be prevented from being locked.

More preferably, the intermediate element has end parts positioned at axial both ends and sandwiched between the projections of the first and last retainer segments, and a center part positioned between the both end parts. According to this constitution, the axial both end parts of the intermediate element abut on the pairs of projections of the first and last retainer segments. Thus, the pillar part of the retainer segment does not abut on the end parts of the intermediate element. Therefore, the load is not applied from the intermediate element to the pillar part.

Still preferably, the center part of the intermediate element has a circumferentially expanding part expanding in the circumferential direction and sandwiched between the pair of projections of the retainer segment. According to this constitution, the axial movement of the intermediate element is restricted by the pair of projections and the axial movement thereof can be prevented. Therefore, the intermediate element can be prevented from being moved in the axial direction.

Still preferably, the intermediate element comprises a groove penetrating in the circumferential direction. According to this constitution, a lubricant agent such as oil and grease can smoothly flow in the groove provided in the intermediate element. Here, the term "penetrating" includes not only the case where the groove penetrates the center part of the intermediate element but also the case where it penetrates on the surface on the inner diameter side or the outer diameter side.

Still preferably, a circumferential gap dimension between the first retainer segment and the intermediate element is not less than 0.15% of the circumference of a circle passing through connection parts of the retainer segments lined continuously with each other in the circumferential direction but less than a maximum diameter of the roller in the axial direction. According to this constitution, the gap dimension between the retainer segments can be appropriately kept. More specifically, when it is 0.15% or more of the circumference, even when each retainer segment thermally expands, the retainer segment is not damaged. Here, as it is considered that the roller is arranged between the adjacent retainer segments to receive the higher load, when the gap dimension is designed to be less than the maximum diameter of the roller, the roller arranged between the adjacent retainer segments can be smoothly guided.

Still preferably, the roller is a tapered roller. The roller bearing used in the main shaft of the wind-power generator needs to receive the high thrust load, moment load and radial load. Here, when the roller is the tapered roller, it can receive the high thrust load. Even when the tapered roller bearing is large in size in order to receive the high thrust load, since the retainer comprises the split type retainer segment, the retainer segment can be easily incorporated and superior in productivity and accordingly the productivity of the tapered roller bearing will be improved.

According to still another aspect of the present invention, a main shaft support structure of a wind-power generator comprises a blade for receiving wind power, a main shaft having one end fixed to the blade and rotating with the blade, and a roller bearing incorporated in a fixing member and supporting the main shaft rotatably. Here, the roller bearing comprises an outer ring, an inner ring, a plurality of rollers arranged between the outer ring and the inner ring, a plurality of retainer segments having pockets for holding the rollers and arranged so as to be continuously lined with each other in a circumferential direction between the outer ring and the inner ring, and an intermediate element arranged between the first retainer segment and the last retainer segment lined continuously with each other in the circumferential direction.

Since the main shaft support structure of the power-wind generator comprises the roller bearing having high productivity, the productivity of the main shaft support structure of the power-wind generator itself is also improved.

According to still another aspect of the present invention, an intermediate element is arranged between a first retainer segment and a last retainer segment lined continuously with each other in a circumferential direction and has an abutment part abutting on the first retainer segment or the last retainer segment. Since the intermediate element is an independent member, the arrangement is unstable in the roller bearing. However, according to the above constitution, the abutment part of the intermediate element can abut on the first retainer segment or the last retainer segment. Therefore, the intermediate element can be stably arranged in the roller bearing.

Still preferably, an intermediate element is arranged between a first retainer segment and a last retainer segment lined continuously with each other in a circumferential direction and has movement restricting means for restricting its axial movement. According to this constitution, the axial movement of the intermediate element itself can be restrained and axial position of the intermediate element can be stabilized.

Still preferably, an intermediate element is arranged between a first retainer segment and a last retainer segment lined continuously with each other in a circumferential direction and comprises a groove for allowing a lubricant agent to flow. According to this constitution, the lubricant agent can flow smoothly in the radial direction and axial direction through the groove provided in the intermediate element. Thus, the lubricant agent can be circulated efficiently in the roller bearing. Therefore, the roller can be rolled smoothly.

Still preferably, an intermediate element is arranged between a first retainer segment and a last retainer segment lined continuously with each other in a circumferential direction and when cut along a plane perpendicular to an axial direction, a length of an diagonal line connecting two corners is larger than a roller diameter at its section. As described above, the arrangement of the intermediate element is unstable in the roller bearing and the intermediate element could fall depending on the dimension of the circumferential gap. However, according to the above constitution, even when the intermediate element receives the circumferential load, the corner of the intermediate element is caught by the outer ring and the like. Therefore, the intermediate element can be prevented from falling.

According to the present invention, the number of the rollers contained in the roller bearing can be increased and the roller arranged between the two retainer segments as well as the roller held in the retainer segment can receive the load. Thus, the roller bearing can receive the high load.

In addition, according to the above retainer segment, the axial movement of the roller arranged between the adjacent retainer segments can be restricted by the pair of projections, the roller arranged between the adjacent retainer segments can be stably arranged.

Furthermore, since the main shaft support structure of the wind-power generator comprises the roller bearing containing the retainer segments split in one annular retainer, the productivity thereof is high. In addition, it comprises the roller bearing having the roller arranged between the adjacent retainer segments, it can receive a higher load.

In addition, according to the roller bearing, the intermediate element can be arranged at the last gap between the first retainer segment and the last retainer segment. Thus, the last gap dimension can be within the appropriate range due to the intermediate element regardless of the dimensional deviation of each retainer segment. Therefore, since it is not necessary to manufacture the retainer segment with high accuracy, the productivity of the retainer segment can be improved. Accordingly, the productivity of the roller bearing can be improved.

In addition, since the main shaft support structure of the wind-power generator comprises the roller bearing having the high productivity, the productivity of the main shaft support structure of the wind-power generator itself can be improved.

In addition, the intermediate element can be stably arranged in the roller bearing.

BEST MODE FOR CARRYING OUT THE INVENTION

Figure 2:
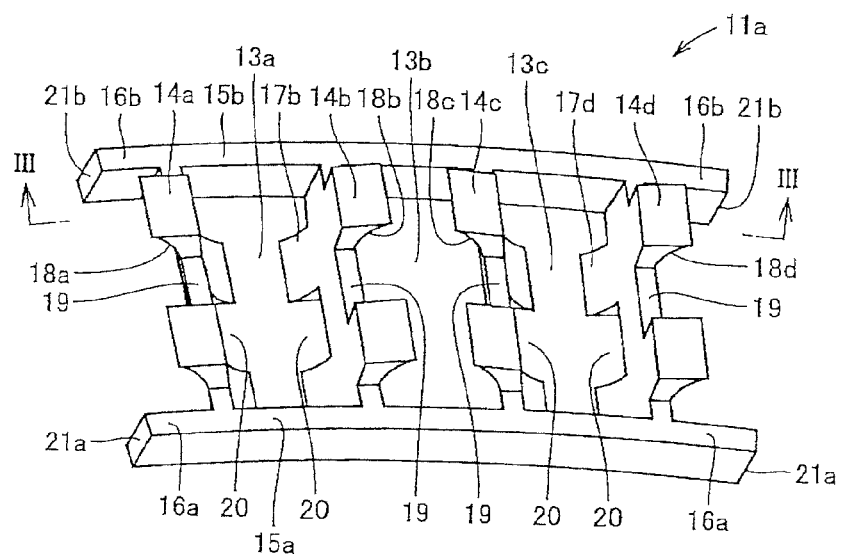
FIG. 2 is a perspective view showing a retainer segment contained in a tapered roller bearing according to one embodiment of the present invention.
Figure 3:
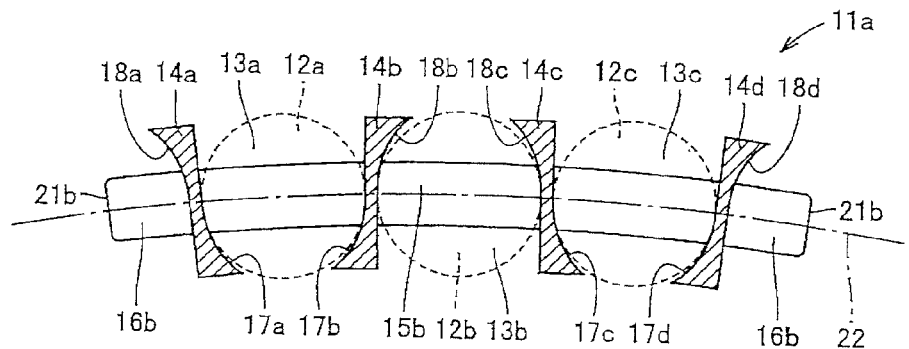
FIG. 3 is a sectional view showing the retainer segment in FIG. 2, cut in a radial direction.
Figure 4:
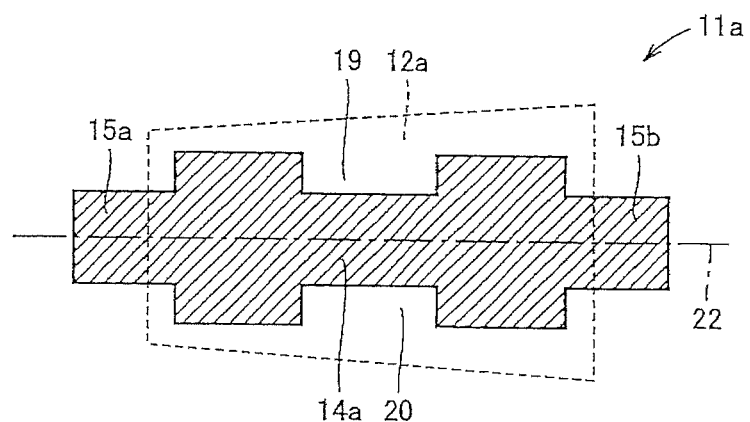
FIG. 4 is a sectional view showing the retainer segment in FIG. 2, cut in an axial direction.

Embodiments of the present invention will be described with reference to the drawings hereinafter. FIG. 2 is a perspective view showing a retainer segment 11a contained in a tapered roller bearing according to one embodiment of the present invention. FIG. 3 is a sectional view showing the retainer segment 11a shown in FIG. 2 cut in a radial direction along arrows III-III in FIG. 2. In addition, FIG. 4 is a sectional view showing the retainer segment 11a containing a pillar part 14a when cut in an axial direction. In addition, to be easily understood, a plurality of tapered rollers 12a, 12b and 12c retained by the retainer segment 11a are shown by dotted lines in FIGS. 3 and 4.

First, the constitution of the retainer segment 11a contained in the tapered roller bearing will be described with reference to FIGS. 2, 3 and 4. The retainer segment 11a comprises four pillar parts 14a, 14b, 14c and 14d extending in the axial direction so as to form pockets 13a, 13b and 13c for holing the tapered rollers 12a, 12b and 12c, a pair of connection parts 15a and 15b positioned at axial both ends and extending in the circumferential direction so as to connect the four pillar parts 14a, 14b, 14c and 14d, and a pair of projections 16a and 16b positioned at axial both ends and projecting in the circumferential direction.

The pair of projections 16a and 16b is in series with the pair of connection parts 15a and 15b and circumferentially project from the pillar parts 14a and 14d positioned on the outermost side in the circumferential direction. That is, the pair of projections 16a and 16b is provided such that the connection parts 15a and 15b extend from the pillar parts 14a and 14d in the circumferential direction.

The pair of connection parts 15a and 15b and the pair of projections 16a and 16b have predetermined curvature radiuses in the circumferential direction so that the plurality of retainer segments 11a and the like are lined continuously with each other in the circumferential direction to form one annular retainer when incorporated in the tapered roller bearing. Among the pair of connection parts 15a and 15b and the pair of projections 16a and 16b, the curvature radius of the connection part 15a and the projection 16a positioned on the small diameter side of the tapered roller 12a is smaller than the curvature radius of the connection part 15b and the projection 16b positioned on the large diameter side of the tapered roller 12a. The circumferential ends of the pair of projections 16a and 16b have end faces 21a and 21b that abut on adjacent retainer segment when the plurality of retainer segments 11a and the like are continuously lined with each other in the circumferential direction.

The pair of projections 16a and 16b form a pocket for holding a roller, between the retainer segment 11a and the other retainer segment when the end faces 21a and 21b abut on those of the other retainer segment.

Guide faces 17a, 17b, 17c and 17d for restricting the retainer segment 11a from moving outward in the radial direction are provided on the inner diameter side of the pillar parts 14a and 14b positioned on circumferential both sides of the pocket 13a and the pillar parts 14c and 14d positioned on circumferential both sides of the pocket 13c. In addition, guide faces 18b and 18c for restricting the retainer segment 11a from moving inward in the radial direction are provided on the outer diameter side of the pillar parts 14b and 14c positioned on circumferential both sides of the pocket 13b. According to the above constitution, the retainer segment 11a is guided by the rollers and the retainer segment 11a can be stably positioned in the radial direction.

Furthermore, guide faces 18a and 18d are provided on the outer diameter side of the pillar parts 14a and 14d positioned on the outermost side in the circumferential direction. Due to the guide faces 18a and 18d, the tapered roller positioned between the adjacent retainer segments can guide the retainer segment.

Here, since the retainer segment 11a is an independent member, when it is incorporated in the tapered roller bearing, it could be inclined with respect to a PCD 22. However, since the retainer segment 11a has three pockets in total, specifically, it has the two inner-diameter guiding pockets 13a and 13c positioned at both ends of the retainer segment 11a, and the one outer-diameter guiding pocket 13b positioned in the center of the retainer segment 11a, the retainer segment 11a is not likely to be inclined with respect to the PCD 22 and its stability is good.

A groove 19 penetrating in the circumferential direction is provided on the outer diameter surface side of the pillar parts 14a, 14b, 14c and 14d, and a groove 20 penetrating in the circumferential direction is provided on the inner diameter surface side thereof. The groove 19 is recessed from the outer diameter surface toward the inner diameter side, in the axial center of the pillar parts 14a to 14d, and the groove 20 is recessed from the inner diameter surface toward the outer diameter side, in the axial center of the pillar parts 14a to 14d. In this constitution, a lubricant agent can flow in the circumferential direction smoothly.

Figure 5:
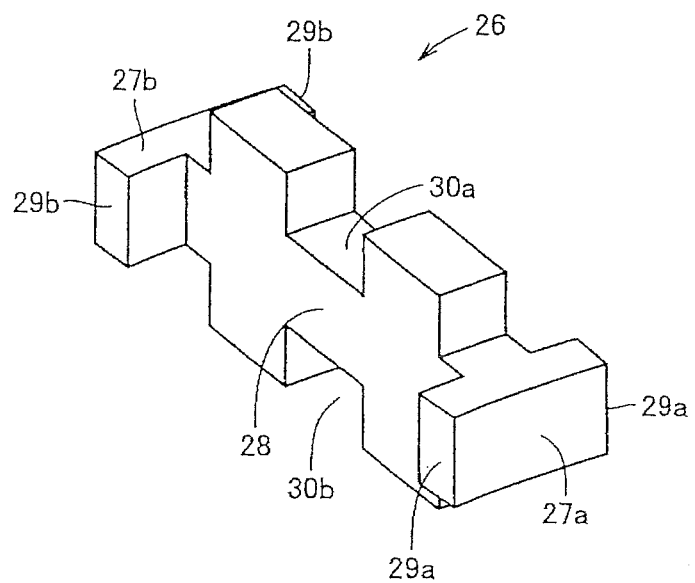
FIG. 5 is a perspective view showing an intermediate element contained in the tapered roller bearing.

Next, an intermediate element 26 contained in the tapered roller bearing according to one embodiment of the present invention will be described. FIG. 5 is a perspective view showing the intermediate element 26 contained in the tapered roller bearing. With reference to FIG. 5, the constitution of the intermediate element 26 will be described. The intermediate element 26 comprises end parts 27a and 27b positioned at both ends in the axial direction and a center part 28 positioned between the end parts 27a and 27b. The axial distance between the end parts 27a and 27b is the same as the axial distance of the pair of projections 16a and 16b contained in the above-described retainer segment 11a.

The circumferential dimension of the center part 28 is smaller than the circumferential dimension of the end parts 27a and 27b. The radial dimension of the center part 28 is designed so as to be a little smaller than the dimension between track surfaces when incorporated in the tapered roller bearing. Thus, when the intermediate element 26 is incorporated in the tapered roller bearing, it is guided by a track ring, so that its radial position becomes stable. The end parts 27a and 27b have end faces 29a and 29b on the circumferential sides. Grooves 30a and 30b penetrating in the circumferential direction are provided on the inner diameter side and the outer diameter side of the center part 28. In this constitution, similar to the grooves 19 and 20 provided in the above-described retainer segment 11a, the lubricant agent can flow smoothly in the circumferential direction.

Figure 6:
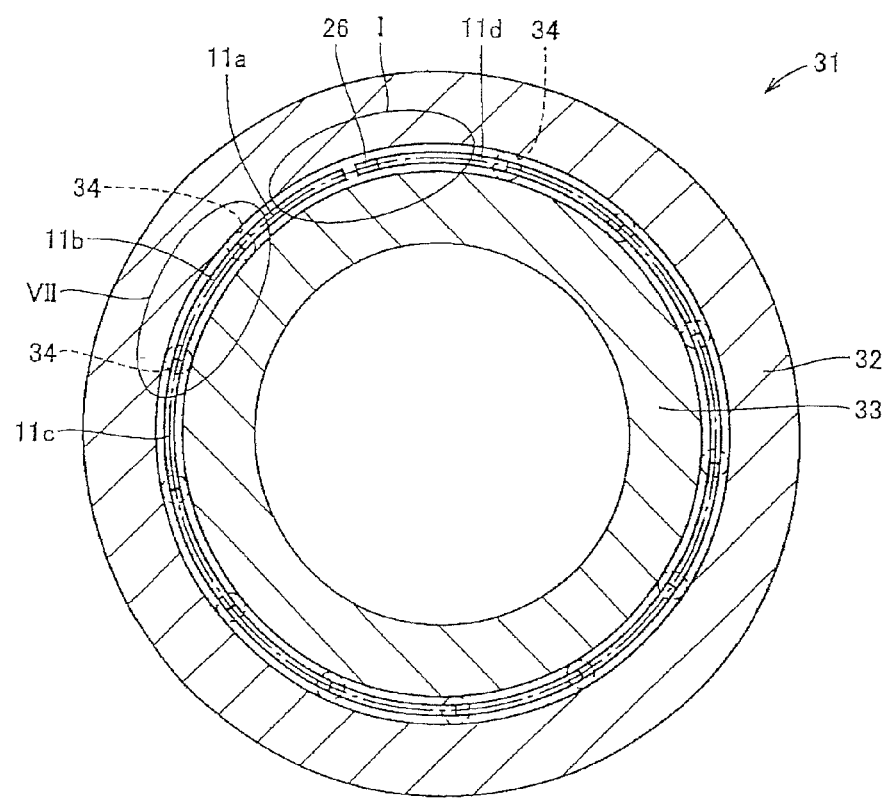
FIG. 6 is a schematic sectional view showing the tapered roller bearing when the plurality of retainer segments and the intermediate element are arranged in a circumferential direction.

Next, the constitution of the tapered roller bearing including the above retainer segment 11a and the intermediate element 26 will be described. FIG. 6 is a schematic sectional view showing a tapered roller bearing 31 viewed from the axial direction in which the plurality of retainer segments 11a, 11b, 11c and 11d and the intermediate elements 26 are arranged in the circumferential direction. Here, since the retainer segments 11b, 11c and 11d have the same configuration of the retainer segment 11a, their description will be omitted. In addition, in FIG. 6, a tapered roller 34 retained by the retainer segment 11a is not shown. In addition, it is assumed that the retainer segment 11a is arranged first and the retainer segment 11d is arranged last among the plurality of retainer segments 11a to 11d.

Referring to FIG. 6, the tapered roller bearing 31 comprises an outer ring 32, and an inner ring 33, the plurality of retainer segments 11a to 11d, and the intermediate element 26. The retainer segments 11a to 11d are continuously lined with each other in the circumferential direction. Here, the retainer segment 11a is arranged first and then the retainer segment 11b is arranged so as to abut on the retainer segment 11a. Then, the retainer segment 11c is arranged so as to abut on the retainer segment 11b. Thus, the retainer segments are sequentially arranged and the retainer segment 11d is arranged last. Here, the tapered roller 34 is disposed between the adjacent two retainer segments 11a and 11b except for the space between the first retainer segment 11a and the last retainer segment 11d.

Figure 7:
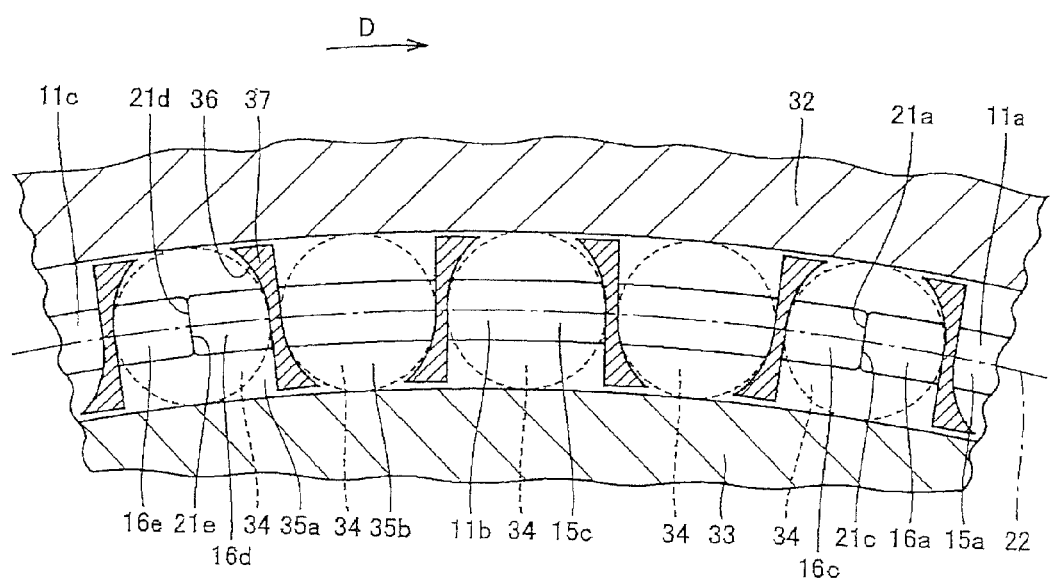
FIG. 7 is an enlarged sectional view showing the adjacent retainer segments.

Next, the retainer segment 11b adjacent to the retainer segments 11a and 11c will be described in detail. FIG. 7 is an enlarged sectional view showing a part VII in FIG. 6. Referring to FIG. 7, the retainer segment 11b is arranged such that an end face 21c of a projection 16c of the retainer segment 11b abuts on the end face 21a of the projection 16a of the retainer segment 11a and an end face 21d of a projection 16d of the retainer segment 11b abuts on an end face 21e of a projection 16e of the retainer segment 11c.

A pocket 35a for housing the tapered roller 34 is formed between the two adjacent retainer segments 11b and 11c. The tapered roller 34 arranged between the adjacent retainer segments 11b and 11c is housed in the pocket 35a. Here, the pocket 35a is formed by determining the projecting amounts of the projection 16d of the retainer segment 11b and the projection 16e of the retainer segment 11c based on the diameter of the tapered roller 34 to be housed.

According to this constitution, the tapered roller bearing 31 receives the load by the tapered roller 34 arranged between the retainer segments 11b and 11c as well as the tapered roller 34 housed in each of the retainer segments 11a to 11d. Thus, the tapered roller bearing 31 can receive a higher load. Especially, when the number of the retainer segments 11a to 11d contained in the tapered roller bearing 31 is increased, the number of the tapered rollers arranged between the retainer segments 11b and 11c and the like is increased, so that the effect is obvious.

In addition, since a guide face 36 is provided on the outer diameter side of a pillar part 37 positioned on the outer side of the retainer segment 11b in the circumferential direction, the retainer segment 11b is guided by the guide face 36 also. Thus, the position of the retainer segment 11b can be further stabilized in the radial direction.

Here, a load is applied from the projection 16e of the adjacent retainer segment 11e to the retainer segment 11b in the circumferential direction, that is, in the direction shown by arrow D in FIG. 7 in some cases. Even in this case, since the projection 16e of the retainer segment 11c abuts on the projection 16d of the retainer segment 11b, a load is not applied to the pillar part 37 forming the pockets 35a and 35b. Thus, the pillar part 37 is prevented from being deformed or damaged and the tapered roller 34 housed in the pocket 35b is prevented from being locked.

Figure 1:
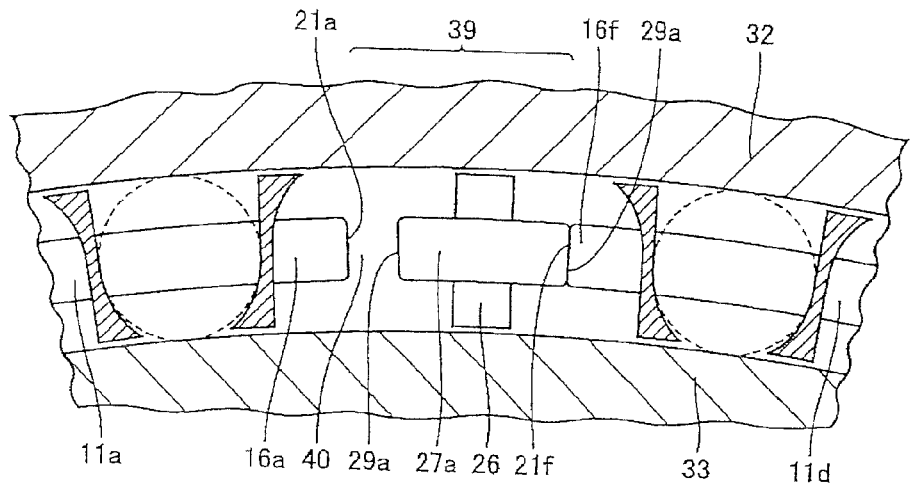
FIG. 1 is an enlarged sectional view showing an intermediate element arranged between a first retainer segment and a last retainer segment.
Figure 8:
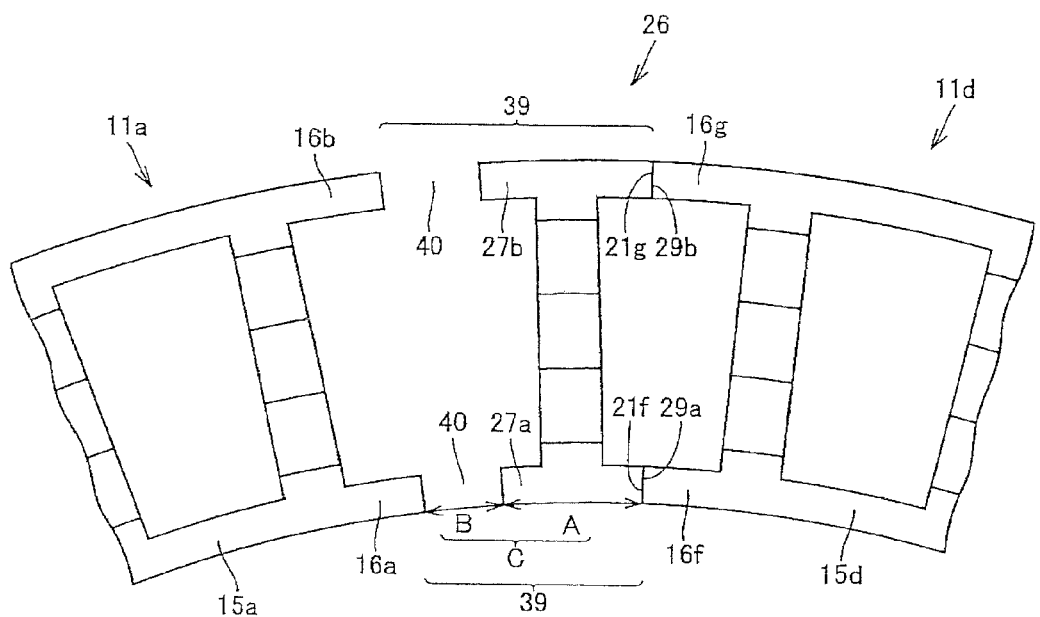
FIG. 8 is a schematic view showing the part shown in FIG. 1 viewed from the outside in the radial direction.

Next, the arranged state of the intermediate element 26 arranged between the first retainer segment 11a and the last retainer segment 11d will be described. FIG. 1 is an enlarged sectional view showing a part I in FIG. 6. In addition, FIG. 8 is a schematic view showing the part shown in FIG. 1 viewed from the outside in the radial direction, that is, from the side of the outer ring 32. Referring to FIGS. 1 and 8, when the retainer segment 11a and the like are continuously lined with each other so as to abut on each other, a gap 39 is generated between the retainer segment 11a and the retainer segment 11d.

The circumferential dimension of the gap 39 is set within a certain range in view of thermal expansion of the retainer segments 11a to 11d due to the rise in temperature. However, the dimension of the gap 39 depends on the dimensional deviation of the retainer segments 11a to 11d accumulated in the circumferential direction. Therefore, it is very difficult to keep the dimension of the gap 39 within the set range.

Thus, the intermediate element 26 is arranged such that end faces 21f and 21g of projections 16f and 16g of the retainer segment 11d abut on one end faces 29a and 29b of the end parts 27a and 27b of the intermediate element 26. In this case, the end parts 27a and 27b of the intermediate element 26 are sandwiched between the projections 16a and 16b of the retainer segment 11a and the projections 16f and 16g of the retainer segment 11d.

According to this constitution, the dimension of a last gap 40 generated between the retainer segment 11a and the intermediate element 26 in the circumferential direction can be within the set range easily. Here, the last gap means a maximum gap between the first retainer segment 11a and the intermediate element 26 arranged between the first retainer segment 11a and the last retainer segment 11d when the retainer segments 11a to 11d are arranged on the circumference without any gap and the last retainer segment 11d and the intermediate element 26 is arranged without any gap. When it is assumed that the dimension of the gap 39 on a circle having the smallest diameter is "C" among circles passing the connection part 15a of the retainer segment 11a, the dimension of the end part 27a is "A", and the dimension of the last gap 40 is "B", the dimension "A" of the end part 27a can be optionally determined so that the dimension "B" of the last gap 40 can be within the set range when the intermediate element 26 is arranged between the retainer segment 11a and the retainer segment 11d. In order to limit the dimension "B" within the set range, the end part 27a may be cut in the circumferential direction based on the dimension "C", or one intermediate element 26 may be selected based on the dimension "C" from the intermediate elements 26 manufactured previously and having various kinds of dimensions "A".

According to the tapered roller bearing 31 having this constitution in which the intermediate element 26 is arranged between the first retainer segment 11a and the last retainer segment 11d, the last gap 40 between the retainer segments 11a and 11d can be within the set range, regardless of the dimensional deviation of the retainer segments 11a to 11d in the circumferential direction. Thus, it is not necessary to manufacture the retainer segments 11a to 11d with high accuracy, so that the productivity of the retainer segments 11a to 11d can be improved. In addition, accordingly, the productivity of the tapered roller bearing 31 can be improved.

Here, the optimal dimension of the last gap 40 in the circumferential direction is not less than 0.15% of the circumference of a circle passing the connection part 15a of the retainer segment 11a but less than a maximum roller diameter of the tapered roller 34 in the axial direction.

In the case where the circumferential dimension of the last gap is not more than 0.15% of the circumference, when the retainer segments 11a to 11d thermally expand, the last gap 40 to be provided between the retainer segment 11a and the intermediate element 26 is not provided, so that a high stress could be applied to the retainer segments 11a to 11d in the circumferential direction. In addition, when the circumferential dimension of the last gap is more than the maximum roller diameter of the tapered roller 34 in the axial direction, the axial arrangement of the tapered roller 34 retained between the adjacent retainer segments 11a to 11d becomes unstable, which could cause a guiding defect.

In addition, as described above, since the intermediate element 26 is arranged between the first retainer segment 11a and the last retainer segment 11d lined continuously with each other in the circumferential direction, it has the abutment part abutting on the first retainer segment 11a or the last retainer segment 11d. Although the intermediate element 26 is an independent member and its arrangement is unstable in the tapered roller bearing 31, the abutment part of the intermediate element 26 can be arranged so as to abut on the first retainer segment 11a or the last retainer segment 11d in this constitution. Therefore, the intermediate element 26 can be stably arranged in the tapered roller bearing 31.

Here, as described above also, it is clear from the above description and FIGS. 1 and 8 that the arrangement of the intermediate element 26 is stabilized because the end faces 29a and 29b as the abutment parts abut on the end faces 21f and 21g of the last retainer segment 11d. Here, the intermediate element 26 can abut on the last retainer segment 11d in another embodiment. For example, the center part 28 of the intermediate element 26 may abut on the pillar part of the last retainer segment 11d. In this case, the abutment part is the center part 28 of the intermediate element 26. According to this constitution, the intermediate element 26 can be also stably arranged. In addition, although the description has been made of the case where the intermediate element 26 abuts on the last retainer segment 11d so as to be easily understood, the intermediate element 26 may abut on the retainer segment 11a to stabilize the arrangement of the intermediate element 26.

As described above, the intermediate element 26 is arranged between the first retainer segment 11a and the last retainer segment 11d lined continuously with each other in the circumferential direction. Here, in a section provided when the intermediate element 26 is cut along a plane perpendicular to the axial direction, the length of a diagonal line connecting two corners is designed so as to be longer than the roller diameter of the tapered roller 34 at that section.

As described above, the arrangement of the intermediate element 26 is unstable in the tapered roller bearing 31 and the intermediate element 26 could fall in the circumferential direction depending on the dimension of the last gap generated between the retainer segments 11a and 11d and the configuration of the intermediate element 26. In this case, the circumferential gap dimension cannot be within the appropriate range. However, the intermediate element 26 can be prevented from falling in the above constitution.

Figure 16:
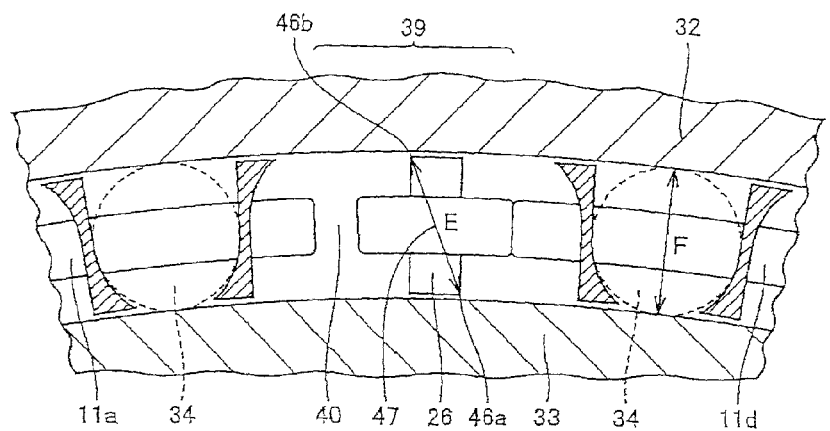
FIG. 16 is an enlarged sectional view showing the intermediate element arranged between the first retainer segment and the last retainer segment, to show the relation between a length between two corners and a roller diameter of the tapered roller.

This will be described with reference in FIG. 16. FIG. 16 is an enlarged sectional view when the intermediate element 26 is arranged between the first retainer segment 11a and the last retainer segment 11d and corresponds to FIG. 1. Referring to FIG. 16, when it is assumed that the length between two corners 46a and 46b of a diagonal line 47 connecting the corner 46a and 46b of the intermediate element 26 is "E" and the roller diameter of the tapered roller 34 is "F", their relation is to be E>F. According to this constitution, even when the intermediate element 26 is about to fall in the circumferential direction, the corners 46a and 46b are caught by the outer ring 32 and the inner ring 33, so that the intermediate element 26 is prevented from falling in the circumferential direction. Here, the diagonal line 47 is a line connecting the two corners 46a and 46b of the intermediate element 26 and a round part is also contained in the corners 46a and 46b.

Here, although the circumferential dimension of the center part 28 of the above intermediate element 26 is designed to be smaller than the circumferential dimension of the end parts 27a and 27b in the above, the present invention is not limited to this and the center part 28 may project in the circumferential direction so that the circumferential dimension of the center part 28 is larger than the circumferential dimension of the end parts 27a and 27b.

Figure 9:
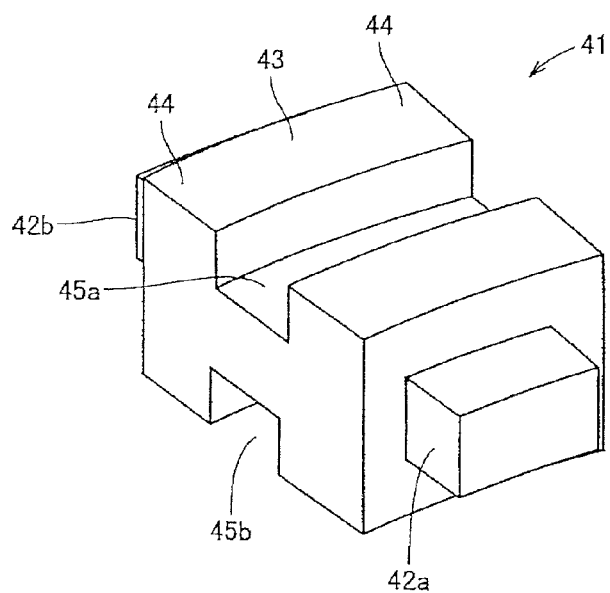
FIG. 9 is a perspective view showing an intermediate element having a circumferential expanding part.

FIG. 9 is a perspective view showing an intermediate element 41 in the above case. Referring to FIG. 9, the intermediate element 41 has end parts 42a and 42b positioned at axial both ends and a center part 43 positioned between the end parts 42a and 42b. A circumferentially expanding part 44 is provided in the center part 43 such that it expands from circumferential both sides in the circumferential direction and is sandwiched between the pair of projections 16a and 16b of the retainer segment 11a and the pair of projections 16f and 16g of the retainer segment 11d. In addition, grooves 45a and 45b penetrating in the circumferential direction are provided on the outer diameter side and the inner diameter side in the radial direction.

Figure 10:
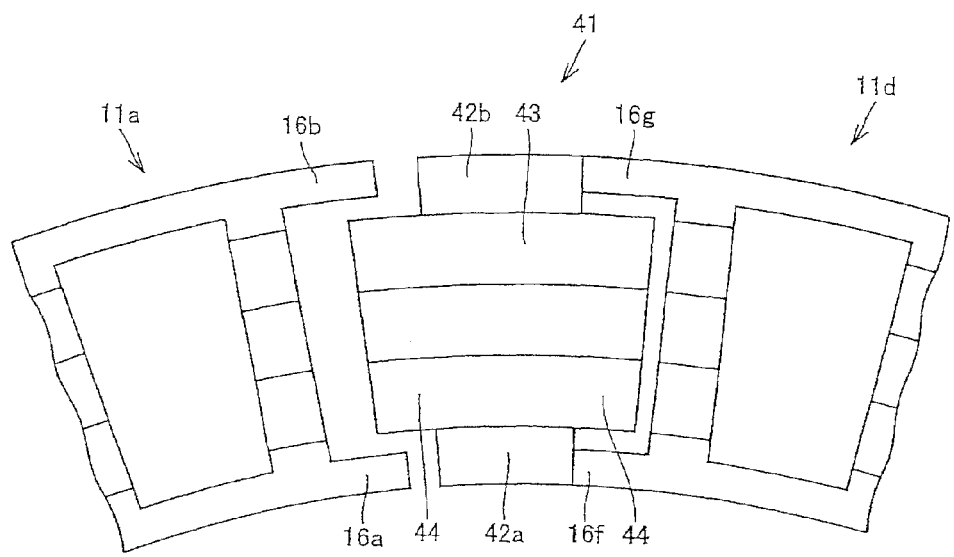
FIG. 10 is a view showing the intermediate element in FIG. 9 viewed from the outside in the radial direction.

FIG. 10 is a view showing the intermediate element 41 arranged between the retainer segments 11a and 11d viewed from the outside in the radial direction. Referring to FIG. 10, the intermediate element 41 is arranged between the first retainer segment 11a and the last retainer segment 11d. Here, the circumferentially expanding part 44 of the intermediate element 41 is sandwiched between the pair of projections 16a and 16b of the retainer segment 11a and the pair of projections 16f and 16g of the retainer segment 11d.

According to the intermediate element 41 having the above constitution, since the circumferentially expanding part 44 is restrained by the pair of projections 16a and 16b and the pair of projections 16f and 16g, the movement in the axial direction is prevented. Thus, the intermediate element 41 is restricted from being moved in the axial direction.

In addition, the circumferentially expanding part 44 expands from both sides of the center part 43 in the circumferential direction in the above, it may expand from one side of the center part 43 in the circumferential direction.

In addition, the intermediate element 41 is arranged between the first retainer segment 11a and the last retainer segment 11d lined continuously with each other in the circumferential direction as described above, and the intermediate element 41 has movement controlling means for controlling the axial movement itself.

The intermediate element 26 is the independent member and its arrangement is unstable in the tapered roller bearing 31. Thus, when the circumferentially expanding part 44 expanding in the circumferential direction is provided in the center part 43 of the intermediate element 41 and the circumferentially expanding part 44 is sandwiched between the pair of projections 16f and 16g, the axial movement of the intermediate element 41 is restricted and the axial displacement thereof is suppressed to stabilize the arrangement thereof in the axial direction, as it is clear from the above description and FIGS. 9 and 10.

Here, the axial movement of the intermediate element 41 can be also restricted in another embodiment. For example, connecting means is provided at the end parts 42a and 42b of the intermediate element 41 to be coupled to the last retainer segment 11d. According to this constitution, when the intermediate element 41 is about to move in the axial direction, since the end faces 42a and 42b are connected to the last retainer segment 11d, the axial movement of the intermediate element 41 is restricted by the retainer segment 11d. Therefore, the axial position of the intermediate element 41 can be stabilized. In this case, connection may be implemented by providing an engagement part at the end faces 42a and 42b of the intermediate element 41 and engaging it with the projections 16f and 16g of the last retainer segment 11d.

Figure 11A:
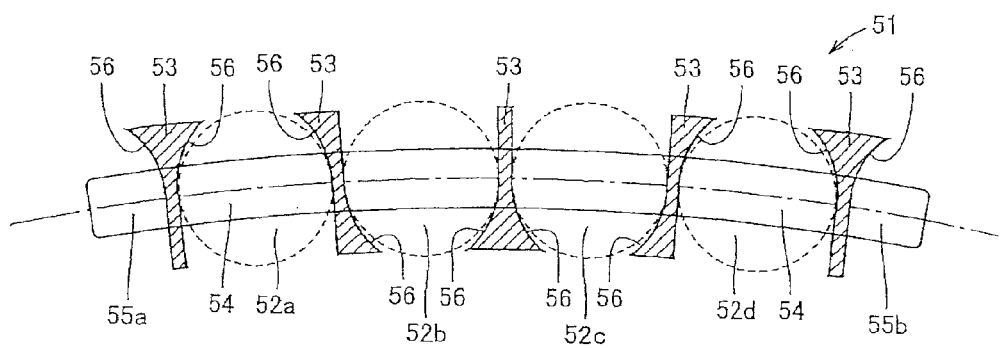
FIG. 11A is a sectional view showing a retainer segment having four pockets according to another embodiment of the retainer segment contained in the tapered roller bearing.
Figure 11B:
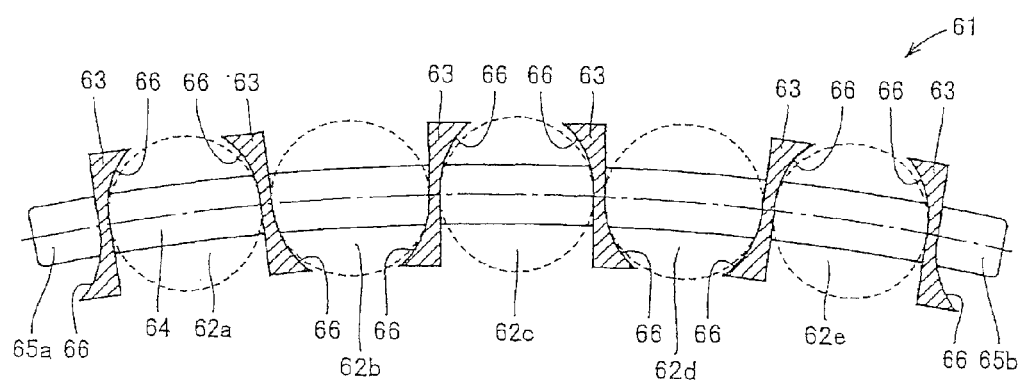
FIG. 11B is a sectional view showing a retainer segment having five pockets according to another embodiment of the retainer segment contained in the tapered roller bearing.

In addition, although the retainer segment 11a has the three pockets for housing the rollers in the above embodiment, it may have four or more pockets. FIGS. 11A and 11B are radial sectional views showing the retainer segments in this case. Referring to FIG. 11A, a retainer segment 51 comprises a plurality of pillar parts 53 extending in the axial direction so as to form four pockets 52a, 52b, 52c and 52d, a pair of connection parts 54 extending in the circumferential direction so as to connect the pillar parts 53, and a pair of projections 55a and 55b positioned at axial both ends and projecting from the connection parts 54 in the circumferential direction. A guide face 56 for guiding the retainer segment 51 is provided on the inner diameter side and the outer diameter side of the pillar part 53. In addition, referring to FIG. 11B, a retainer segment 61 comprises a plurality of pillar parts 63 extending in the axial direction so as to form five pockets 62a, 62b, 62c, 62d and 62e, a pair of connection parts 64 extending in the circumferential direction so as to connect the pillar parts 63, and a pair of projections 65a and 65b positioned at axial both ends and projecting from the connection parts 64 in the circumferential direction. A guide face 66 for guiding the retainer segment 61 is provided on the inner diameter side and the outer diameter side of the pillar part 63. According to the above constitution, since the retainer segments 51 and 61 have many pockets 52a and the like provided with the guide faces 56 and 66, they are stably arranged in the radial direction.

In addition, although the grooves 30a and 30b penetrating in the circumferential direction are provided on the outer diameter side and the inner diameter side of the intermediate element 26 in the above embodiment, the present invention is not limited to this, so that the groove 30a may be provided in either the inner or outer diameter surface, and the radial center part of the center part 28 may penetrate in the circumferential direction. In this case, when the positions of the grooves 19 and 20 provided in the retainer segments 11a and 11d and the position of the groove 30a provided in the intermediate element 26 are aligned in the radial direction, the lubricant agent can flow more efficiently.

In addition, as described above, the intermediate element 26 is arranged between the first retainer segment 11a and the last retainer segment 11d lined continuously with each other in the circumferential direction, and the intermediate element 26 has the groove to flow the lubricant agent. The intermediate element 26 has the grooves 30a and 30b penetrating in the circumferential direction. This is clear from the above description and FIGS. 5 and 8 to 10. Here, a groove penetrating in the axial direction and a groove penetrating in the radial direction may be provided as well as in the circumferential direction.

According to this constitution, the lubricant agent can smoothly flow in the axial and radial directions. Thus, the lubricant agent can be circulated efficiently through the grooves of the intermediate element 26 in the tapered roller bearing 31. Therefore, the tapered roller 34 can be smoothly rolled. In this case, as described above, the groove may penetrate the surface of the intermediate element 26 or may penetrate the center part of the intermediate element 26. In addition, the plurality of grooves may be provided in the axial, radial and circumferential directions.

Figure 12:
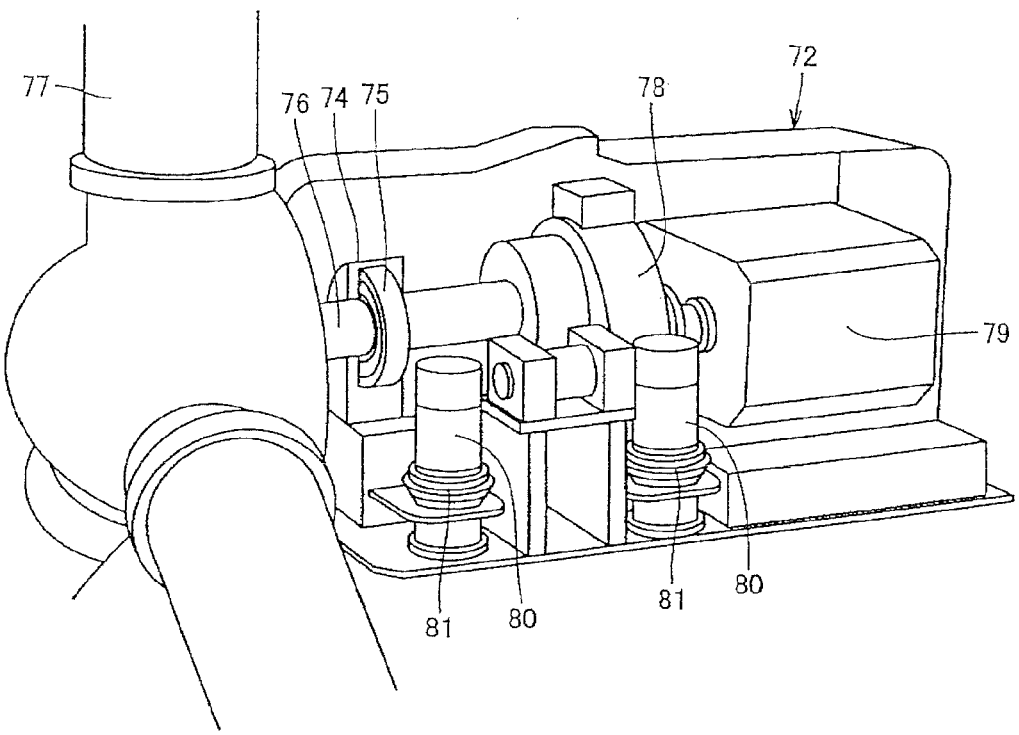
FIG. 12 is a view showing one example of a main shaft support structure of a wind-power generator employing the tapered roller bearing according to the present invention.
Figure 13:
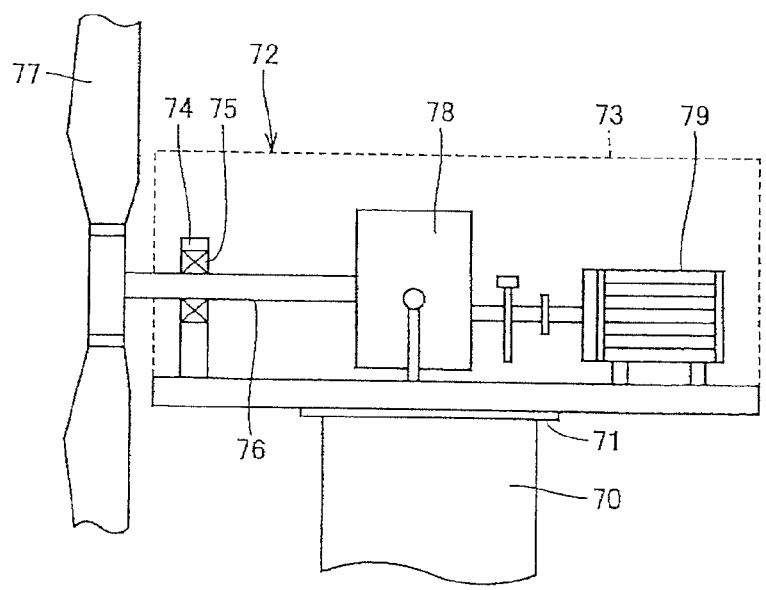
FIG. 13 is a schematic side view showing the main shaft support structure of the wind-power generator shown in FIG. 12.
Figure 14:
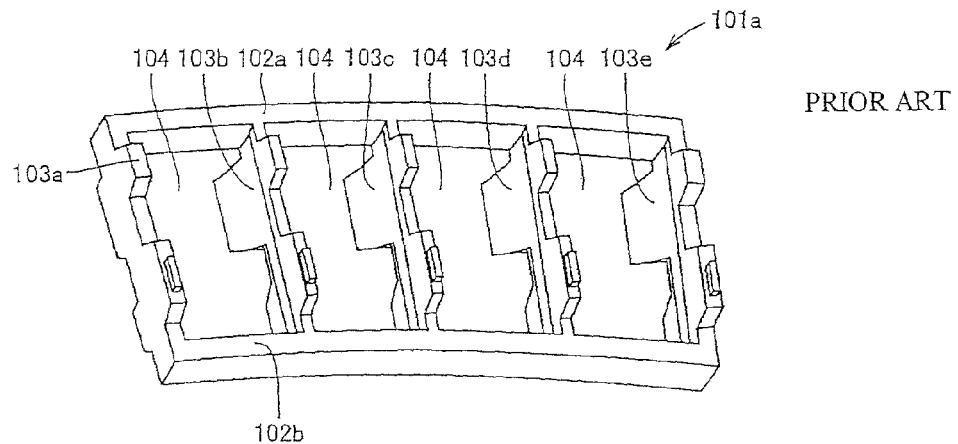
FIG. 14 is a perspective view showing a conventional retainer segment.
Figure 15:
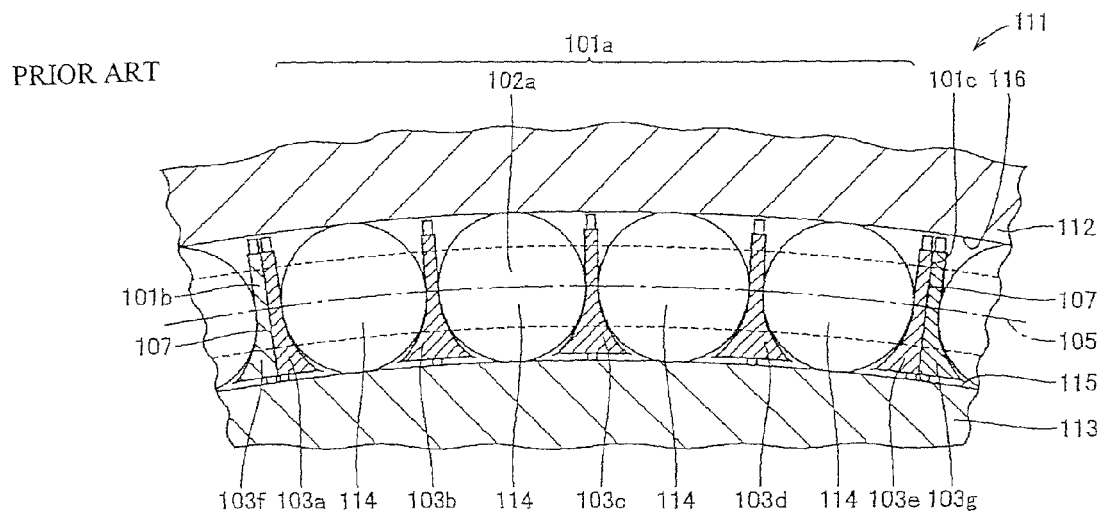
FIG. 15 is a sectional view showing the retainer segment in FIG. 14, cut in the radial direction.

FIGS. 12 and 13 show one example of a main shaft support structure of a wind-power generator in which the roller bearing according to one embodiment of the present invention is used as a main shaft support bearing 75. A casing 73 of a nacelle 72 for supporting the main part of the main shaft support structure is put on a support table 70 through a slewing bearing 71 at a high position so as to be horizontally turned. A blade 77 receiving wind power is fixed to one end of a main shaft 76. The main shaft 76 is rotatably supported in the casing 73 of the nacelle 72 through the main shaft support bearing 75 incorporated in a bearing housing 74, and the other end of the main shaft 76 is connected to a speed-up gear 78, and an output shaft of the speed-up gear 78 is coupled to a rotor shaft of a generator 79. The nacelle 72 is turned in any angle by a rotation motor 80 through a speed-down gear 81.

The main shaft support bearing 75 incorporated in the bearing housing 74 is the roller bearing according to one embodiment of the present invention and comprises the outer ring, the inner ring, the plurality of rollers arranged between the outer ring and the inner ring, and the plurality of retainer segments having pockets for holding the rollers and sequentially arranged to be continuously lined with each other in the circumferential direction. In addition, except for between the first retainer segment and the last retainer segment lined continuously with each other in the circumferential direction, the roller is arranged between the two adjacent retainer segments. In addition, the roller bearing further comprises the intermediate element arranged between the first retainer segment and the last retainer segment lined continuously with each other in the circumferential direction.

Since the main shaft support bearing 75 supports the main shaft 76 whose one end is fixed to the blade 77 receiving great wind power, it receives a high load. Thus, the main shaft support bearing 75 has to be large itself. Here, when the tapered roller bearing comprising the retainer segments split in the annular retainer is used, since the productivity, handling property and assembling property of the retainer can be improved, the productivity of the tapered roller bearing itself can be improved. In addition, since the roller is arranged between the two adjacent retainer segments except for between the first retainer segment and the last retainer segment, the number of the rollers in the roller bearing can be increased. Thus, the roller arranged between the two adjacent retainer segments as well as the roller held in the retainer segment can receive the load. Therefore, the roller bearing can receive a high load.

In addition, since the last gap 40 between the retainer segments arranged in the circumferential direction can be within a range set by the intermediate element, the damage and noise caused by the thermal expansion of the retainer segment due to the temperature increase and the collision between the retainer segment can be prevented.

In addition, although the retainer segment has the projection projecting in the circumferential direction in the above embodiment, the present invention is not limited to this and can be applied to a retainer segment having no projection, that is, having a constitution in which the pillar part is provided at the end in the circumferential direction.

In addition, since the above intermediate element 26 contained in the tapered roller bearing 31 is small in size and simple in configuration, when it is formed of a resin such as engineering plastics by an injection molding, it can be easily produced. Thus, the productivity is further improved.

In addition, although the tapered roller is used as the roller housed in the retainer segment 11a in the above embodiment, the present invention is not limited to this and may employ a cylindrical roller, a needle roller and a long roller.

Although the embodiments of the present invention have been described with reference to the drawings in the above, the present invention is not limited to the above-illustrated embodiments. Various kinds of modifications and variations may be added to the illustrated embodiments within the same or equal scope of the present invention.

INDUSTRIAL APPLICABILITY

Since the roller bearing according to the present invention can receive a high load, it can be effectively used in the case where a high load is applied.

In addition, according to the roller bearing in the present invention, since the last gap between the retainer segments can be within the set range regardless of the dimensional precision of the retainer segment, the productivity of the roller bearing can be improved.

According to the retainer segment in the present invention, when the roller is arranged between the adjacent retainer segments, since the axial movement of the roller can be restricted, it can be effectively used in a rolling bearing that needs to stably hold the roller in the axial direction.

In addition, since the main shaft support structure of the wind-power generator according to the present invention is high in productivity and can receive a high load, it can be effectively used as a main shaft support structure of the wind-power generator required to have high productivity and receive high wind power.

In addition, according to the main shaft support structure of the wind-power generator in the present invention, since the roller bearing can be easily produced, it can be effectively used in a main shaft support structure of the wind-power generator required to have improved productivity.

The invention claimed is:

1. A roller bearing comprising:
    an outer ring;
    an inner ring;
    a plurality of rollers arranged between said outer ring and said inner ring;
    a plurality of retainer segments having pockets for holding said rollers and arranged so as to be continuously in line with each other in a circumferential direction between said outer ring and said inner ring, the plurality of retainer segments including a first retainer segment and a last retainer segment,
    an intermediate element arranged between the first retainer segment and the last retainer segment in line continuously with each other in the circumferential direction, wherein the intermediate element is independent and separate from adjacent retainer segments, and further wherein a number of the retainer segments is three or more; and a gap exists between the first retainer segment and the intermediate element,
    wherein the intermediate element has a center part and end parts and a circumferential dimension of the center part is smaller than a circumferential dimension of the end parts.

2. The roller bearing according to claim 1, wherein
    said retainer segment comprises a pair of projections positioned at axial both ends and projecting in the circumferential direction, and
    said intermediate element abuts on circumferential end faces of the pair of projections provided in said first retainer segment and circumferential end faces of the pair of projections provided in said last retainer segment.

3. The roller bearing according to claim 2, wherein
    said intermediate element has end parts positioned at axial both ends and sandwiched between the projections of said first and last retainer segments, and a center part positioned between the both end parts.

4. The roller bearing according to claim 1, wherein
said intermediate element comprises a groove penetrating in the circumferential direction.

5. The roller bearing according to claim 1, wherein
a circumferential gap dimension between said first retainer segment and said intermediate element is not less than 0.15% of a circumference of a circle aligned with an inner radial side surface of of said retainer segments in line continuously with each other in the circumferential direction, and the circumferential gap is less than a maximum diameter of each of the rollers.

6. The roller bearing according to claim 1, wherein
said rollers are tapered rollers.

7. A main shaft support structure of a wind-power generator comprising:
a blade for receiving wind power;
a main shaft having one end fixed to said blade and rotating with the blade; and
a roller bearing incorporated in a fixing member and supporting said main shaft rotatably, wherein
said roller bearing comprises an outer ring, an inner ring, a plurality of rollers arranged between said outer ring and said inner ring, a plurality of retainer segments having pockets for holding said rollers and arranged so as to be continuously in line with each other in a circumferential direction between said outer ring and said inner ring, and an intermediate element arranged between a first retainer segment and a last retainer segment continuously in line with each other in the circumferential direction, wherein the intermediate element is independent and separate from adjacent retainer segments, and further wherein a number of the retainer segments is three or more; and a gap exists between the first retainer segment and the intermediate element,
wherein the intermediate element has a center part and end parts and a circumferential dimension of the center part is smaller than a circumferential dimension of the end parts.

* * * * *